US012746611B2

(12) United States Patent
Mo

(10) Patent No.: US 12,746,611 B2
(45) Date of Patent: Sep. 29, 2026

(54) REAMING TOOL

(71) Applicant: Weiqi Mo, Dongguan City (CN)

(72) Inventor: Weiqi Mo, Dongguan City (CN)

( * ) Notice: Subject to any disclaimer, the term of this patent is extended or adjusted under 35 U.S.C. 154(b) by 0 days.

(21) Appl. No.: 19/645,651

(22) Filed: Apr. 13, 2026

(65) Prior Publication Data

US 2026/0241472 A1 Aug. 20, 2026

(51) Int. Cl.

*B23D 75/00* (2006.01)
*B23D 77/14* (2006.01)
*B25G 1/08* (2006.01)

(52) U.S. Cl.

CPC ........... *B23D 75/005* (2013.01); *B23D 77/14* (2013.01); *B25G 1/08* (2013.01); *B23D 2277/50* (2013.01)

(58) Field of Classification Search

CPC ................................ B23D 75/005; B25G 1/08
See application file for complete search history.

(56) References Cited

U.S. PATENT DOCUMENTS 686,424 A * 11/1901 Smith ................. B25B 23/0035 81/439
6,354,177 B2 * 3/2002 Peters ................... B25B 21/007 81/439
8,621,961 B2 * 1/2014 Burch ..................... B25B 15/02 81/436
11,211,758 B2 * 12/2021 Hoppe .................... B25B 19/00
2008/0184854 A1 * 8/2008 Peters ................. B25B 23/0064 81/451
2014/0260046 A1 * 9/2014 Baynham ............ E04G 23/0203 52/514
2015/0336246 A1 * 11/2015 Peters ....................... H01F 7/02 81/439
2018/0043516 A1 * 2/2018 Zhang ..................... B25B 15/02

* cited by examiner

*Primary Examiner* — Kyle A Cook
(74) *Attorney, Agent, or Firm* — JEEN IP LAW, LLC

(57) ABSTRACT

A reaming tool, including: a gripping body, a first reaming assembly and a second reaming assembly. The gripping body has a working end and a receiving end, and an accommodating space is formed inside the gripping body. The first reaming assembly is detachably mounted on the working end. A second reaming assembly is detachably stored at the receiving end. The first reaming assembly and the second reaming assembly are configured to be simultaneously accommodated within the accommodating space of the gripping body. Each of the two reaming assemblies has two working head of different sizes. The reaming tool can carry four different sizes of working heads (4AN, 6AN, 8AN, 10AN) individually, reducing the cost of use, solving the problems of inconvenient carrying and difficult storage, and eliminating the shaking noise at the storage end.

18 Claims, 7 Drawing Sheets

REAMING TOOL

TECHNICAL FIELD

The present disclosure relates to the technical field of manual tools, in particular to a reaming tool for Polytetrafluoroethylene (PTEE).

BACKGROUND

With the rapid development of the automotive industry, hydraulic systems, and fluid transmission fields, PTFE hoses (Teflon tubes) are widely used in various types of pipeline connection systems due to their excellent high-temperature resistance and corrosion resistance. However, before PTFE hoses are assembled with fittings, the outer stainless steel braided layer must first be stripped and the pipe mouth must be corrected. This process imposes high requirements on the reaming tool.

Currently, the PTFE hose reaming tools available on the market have a main body structure that can only accommodate two sizes of reaming assemblies at the same time, such as a set of 4AN and 6AN, or a set of 8AN and 10AN. Since the commonly used sizes of PTFE hoses cover four specifications—4AN, 6AN, 8AN, and 10AN—users often need to purchase or carry two different reaming tools simultaneously in order to cover all operational requirements. This not only increases usage costs but also causes inconveniences in tool storage and difficulties in portability. In addition, when the two reaming assemblies is stored inside the tool body, due to the lack of an effective fixing structure, the two reaming assemblies easily shakes inside the body and produces abnormal noises, affecting the user experience and operational stability.

SUMMARY

In order to overcome the deficiencies of the prior art, the present disclosure provides a reaming tool that has a compact structure and is provided with a first reaming assembly detachably mounted at the working end and a second reaming assembly detachably stored at the receiving end. The two reaming assemblies can be simultaneously accommodated within the accommodating space of the gripping body, thereby enabling a single tool to carry four different sizes of working heads. The accommodating space includes a mounting channel with a smaller inner diameter and a storage channel with a larger inner diameter; an abutting plane is formed at a junction of the two channels, and the axial length of the mounting channel is shorter than that of the storage channel. The two reaming assemblies are in the shape of a stepped shaft and each includes an abutting convex ring, a transition shaft section, and two different-sized working heads extending to both sides. The outer diameters of the abutting convex rings of the two reaming assemblies are equal and match the storage channel; the outer diameters of the transition shaft sections are equal and cooperate with the mounting channel. The two reaming assemblies can be interchangeably mounted at the working end or stored at the receiving end. An elastic component is provided between the abutting plane and each abutting convex ring to apply an axial preload force, which effectively eliminates the shaking and abnormal noise at the receiving end and further improves the user's experience.

To realize the above objective, the present disclosure provides a reaming tool, including: a gripping body having a working end and a receiving end, and an accommodating space is formed inside the gripping body; a first reaming assembly, detachably mounted on the working end; a second reaming assembly, detachably stored at the receiving end; wherein the first reaming assembly and the second reaming assembly are configured to be simultaneously accommodated within the accommodating space of the gripping body.

Perfectly, the accommodating space comprises a mounting channel located at the working end and a storage channel located at the receiving end, an inner diameter of the mounting channel is smaller than that of the storage channel, and an abutting plane is formed at a junction of the mounting channel and the storage channel.

Perfectly, an axial length of the mounting channel is smaller than an axial length of the storage channel.

Perfectly, the axial length of the mounting channel is ⅓ to ½ of the axial length of the storage channel.

Perfectly, the first reaming assembly has a stepped shaft shape, comprises a first abutting convex ring located in a middle and being the thickest portion, and first transition shaft sections respectively disposed on two sides of the first abutting convex ring, wherein the first transition shaft sections respectively extend outward to form a first working head and a second working head of different sizes.

Perfectly, the second reaming assembly is in a stepped shaft shape, comprises a second abutting convex ring located in a middle and being the thickest portion, and second transition shaft sections respectively disposed on two sides of the second abutting convex ring, wherein the second transition shaft sections respectively extending outward to form a third working head and a fourth working head of different sizes.

Perfectly, an outer diameter of the first abutting convex ring is equal to an outer diameter of the second abutting convex ring, and the outer diameter of the first abutting convex ring and the outer diameter of the second abutting convex ring are configured to match an inner diameter of the storage channel.

Perfectly, an outer diameter of the first transition shaft sections is equal to an outer diameter of the second transition shaft sections, and the first transition shaft sections and the second transition shaft sections are configured to fit with the mounting channel.

Perfectly, the working end has an abutting end face, and when the first reaming assembly or the second reaming assembly is mounted on the working end, the first abutting convex ring or the second abutting convex ring are configured to abut against the abutting end face.

Perfectly, the first working head, the second working head, the third working head, and the fourth working head are respectively configured to match four different sizes of hoses.

Perfectly, the four different sizes are 4AN, 6AN, 8AN, and 10AN.

Perfectly, an elastic component is disposed between the abutting plane and the first abutting convex ring or the second abutting convex ring stored at the receiving end, the elastic component being configured to apply an axial preload force to the first reaming assembly or the second reaming assembly.

Perfectly, one end of the elastic component abuts against the abutting plane and the other end abuts against the first abutting convex ring or the second abutting convex ring; and the elastic component is a spring.

Perfectly, the working end of the gripping body is provided with a first external thread, and the receiving end is provided with a second external thread.

Perfectly, a first end cap is provided with an internal thread that mates with the first external thread, the first end cap is configured to fix the first abutting convex ring or the second abutting convex ring against the abutting end face when the first reaming assembly or the second reaming assembly is mounted on the working end.

Perfectly, the first end cap comprises a through hole, a size of the through hole matching the outer diameters of the first transition shaft sections and the second transition shaft sections; when the first end cap is threadedly connected to the working end, one working head of the first reaming assembly or the second reaming assembly mounted on the working end protrudes from the through hole for mating with a hose of a corresponding size, while the other working head of the first reaming assembly or the second reaming assembly is accommodated within the mounting channel.

Perfectly, a second end cap is provided with an internal thread that mates with the second external thread, and the second end cap is configured to close the receiving end.

Perfectly, when the second reaming assembly is stored within the storage channel and the second end cap is threadedly connected to the receiving end, the second reaming assembly abuts against the second end cap under the preload force of the elastic component, thereby being axially fixed.

Perfectly, the first reaming assembly and the second reaming assembly are interchangeably mountable on the working end or storable at the receiving end.

Perfectly, a radial cross-section of an outer contour of the gripping body is a regular polygon, and a radial cross-section of the accommodating space is a circle.

The beneficial effects of the present disclosure are as follows. Through the above structural arrangement, during use the user can, according to the size of the hose to be processed, mounting the two reaming assemblies containing the corresponding-size working head at the working end, while the other reaming assembly is stored at the receiving end. When it is necessary to switch hose sizes, it is only required to detach the currently mounted reaming assembly from the working end and store it at the receiving end, while simultaneously removing the other reaming assembly from the receiving end and mounting it at the working end. This “dual reaming-assembly compatible, plug-and-play” switching mode enables a single tool to cover the four commonly used sizes of PTFE hoses—4AN, 6AN, 8AN, and 10AN. Compared with the traditional method that requires carrying two tools, the usage cost is significantly reduced, and the convenience of portability and storage is effectively improved. Taking the accommodating space as the reference, the outer diameters of the abutting convex rings of the two reaming assemblies are equal and match the inner diameter of the storage channel, while the outer diameters of the transition shaft sections are equal and fit the mounting channel, ensuring precise axial positioning whether any reaming assembly is mounted at the working end or stored at the receiving end. The abutting plane at the junction of the mounting channel and the storage channel cooperates with the elastic component to apply an axial preload force to the two reaming assemblies stored at the receiving end, so that it remains stable at all times during tool carrying or use, effectively eliminating abnormal noises caused by shaking and further enhancing the user’s experience.

BRIEF DESCRIPTION OF DRAWINGS

In order to more clearly illustrate the technical solutions in the embodiments of the present disclosure, the drawings required for use in the description of the embodiments are briefly introduced below. The drawings in the following description are merely some embodiments of the present disclosure. For a person of ordinary skill in the art, other drawings can also be obtained on the basis of these drawings without involving any creative effort. In addition, the drawings are not drawn to a 1:1 scale, and the relative sizes of the various components in the drawings are only schematically illustrated and do not necessarily follow the actual proportions.

The present disclosure will be further described below in conjunction with the drawings and embodiments.

DESCRIPTION OF THE REFERENCE NUMERALS

Figure 1:
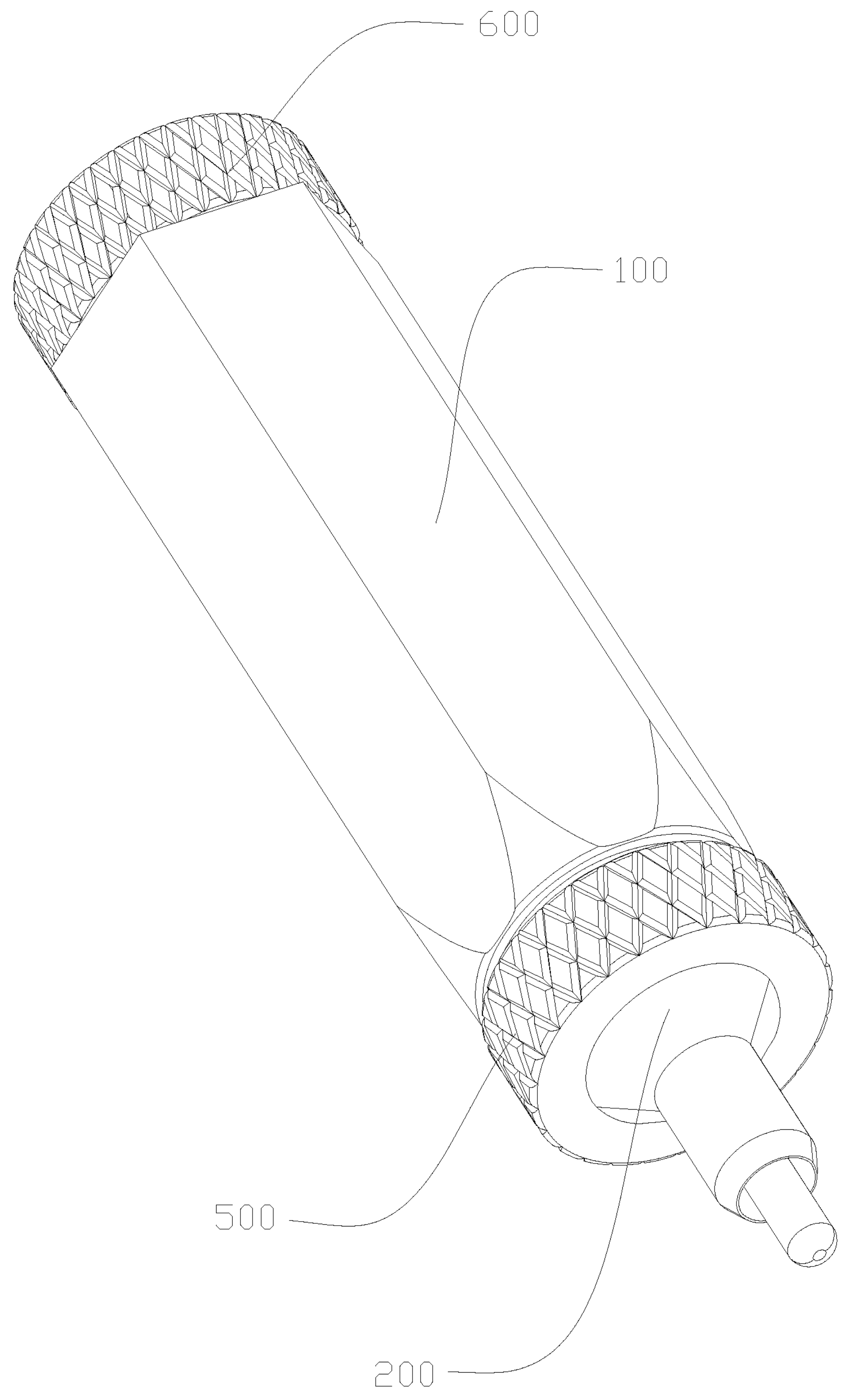
FIG. 1 is a schematic structural diagram of a reaming tool according to one embodiment of the present disclosure, viewed from a first angle.
Figure 2:
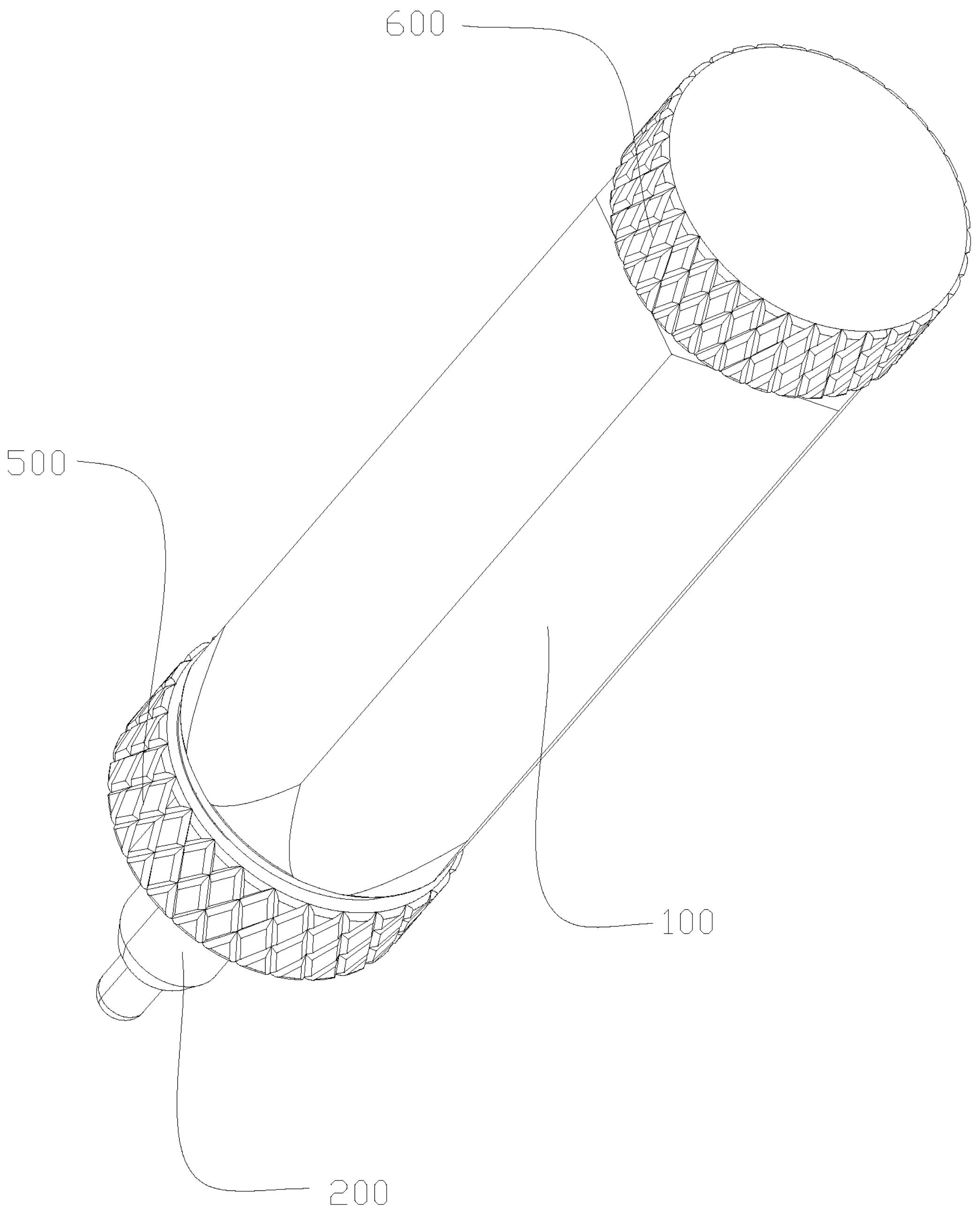
FIG. 2 is a schematic structural diagram of the reaming tool according to one embodiment of the present disclosure, viewed from a second angle.

100 gripping body, 200 first reaming assembly, 300 second reaming assembly, 400 elastic component, 500 first end cap, 600 second end cap, 110 working end, 111 abutting end face, 112 first external thread, 120 receiving end, 121 second external thread, 130 accommodating space, 131 mounting channel, 132 storage channel, 133 abutting plane, 210 first abutting convex ring, 220 first transition shaft section, 230 first working head, 240 second working head, 310 second abutting convex ring, 320 second transition shaft section, 330 third working head, 340 fourth working head, 510 through hole.

DETAILED DESCRIPTION OF THE EMBODIMENTS

In order to make the above objectives, features, and advantages of the present disclosure more obvious and comprehensible, the specific implementation modes of the present disclosure are described in detail below in conjunction with the drawings. In the following description, many specific details are set forth in order to facilitate a full understanding of the present disclosure. However, the present disclosure can be implemented in many other ways different from those described herein. A person skilled in the art can make similar improvements without departing from the connotation of the present disclosure. Therefore, the present disclosure is not limited by the specific embodiments disclosed below.

In the description of the present disclosure, it should be understood that when terms such as “center,” “longitudinal,” “lateral,” “length,” “width,” “thickness,” “upper,” “lower,” “front,” “rear,” “left,” “right,” “vertical,” “horizontal,” “top,” “bottom,” “inner,” “outer,” “clockwise,” “counter-clockwise,” “axial,” “radial,” “circumferential,” and the like appear, the orientation or positional relationship indicated by these terms is based on the orientation or positional relationship shown in the drawings, and is merely for the convenience of describing the present disclosure and simplifying the description, rather than indicating or implying that the referred device or element must have a specific orientation, be constructed and operated in a specific orientation; therefore, these terms cannot be understood as limiting the present disclosure.

In addition, when terms such as “first” and “second” appear, these terms are used only for descriptive purposes and cannot be understood as indicating or implying relative importance or implicitly indicating the number of technical features indicated. Thus, a feature defined as “first” or “second” may explicitly or implicitly include at least one of the features. In the description of the present disclosure, when the term “plurality” appears, the meaning of “plurality” is at least two, for example two, three, etc., unless otherwise clearly and specifically limited.

In the present disclosure, unless otherwise clearly stipulated and limited, when terms such as “installed,” “connected,” “linked,” “fixed,” and the like appear, these terms should be understood in a broad sense. For example, they may refer to a fixed connection, a detachable connection, or an integral connection; they may refer to a mechanical connection or an electrical connection; they may refer to a direct connection or an indirect connection through an intermediate medium; they may refer to internal communication between two elements or an interaction relationship between two elements, unless otherwise clearly defined. For a person of ordinary skill in the art, the specific meanings of the above terms in the present disclosure can be understood according to specific circumstances.

In the present disclosure, unless otherwise clearly stipulated and limited, when a description such as the first feature being “on” or “under” the second feature or similar descriptions appears, its meaning may be that the first and second features are in direct contact, or that the first and second features are in indirect contact through an intermediate medium. Moreover, the first feature being “above,” “over,” or “on” the second feature may mean that the first feature is directly above or obliquely above the second feature, or may simply mean that the horizontal height of the first feature is higher than that of the second feature. The first feature being “below,” “under,” or “beneath” the second feature may mean that the first feature is directly below or obliquely below the second feature, or may simply mean that the horizontal height of the first feature is lower than that of the second feature.

It should be noted that if an element is referred to as being “fixed to” or “disposed on” another element, it may be directly on the other element or there may be an intervening element. If an element is considered to be “connected to” another element, it may be directly connected to the other element or there may simultaneously be an intervening element. If present, the terms “vertical,” “horizontal,” “upper,” “lower,” “left,” “right,” and similar expressions used in the present disclosure are for illustrative purposes only and do not indicate that they are the only implementation modes.

Referring to FIGS. 1 to 7, a reaming tool is provided, including a gripping body 100, a first reaming assembly 200, and a second reaming assembly 300. The gripping body 100 includes a working end 110 and a receiving end 120, and an accommodating space 130 formed inside the gripping body 100. The first reaming assembly 200 detachably mounted to the working end 110. The second reaming assembly 300 is detachably stored in the receiving end 120. The first reaming assembly 200 and the second reaming assembly 300 are configured to be simultaneously accommodated within the accommodating space 130 of the gripping body 100.

Through the arrangement of the above structure, in use, according to the size of the Polytetrafluoroethylene (PTFE) hose to be processed, a user can, mount one of the two reaming assemblies-each provided with the working heads of the corresponding size to the working end 110, while the other reaming assembly is stored in the receiving end 120. When it is necessary to switch the hose size, it is only required to detach the reaming assembly currently mounted on the working end 110 and store it in the receiving end 120, while simultaneously taking out the other reaming assembly from the receiving end 120 and mounting it to the working end 110. Such a “dual reaming-assembly compatible, plug-and-play” switching mode enables a single tool to cover four commonly used sizes of PTFE hoses, namely 4AN, 6AN, 8AN and 10AN. Compared with the conventional manner that requires carrying two tools, the use cost is significantly reduced, and the convenience of carrying and storage is effectively improved.

In general, the numeral contained in the AN designation (for example, AN3, AN4, . . . , AN 10) represents a nominal size expressed in increments of $1/16$ inch, wherein the numeral multiplied by $1/16$ inch corresponds to the outer diameter of hard tubes (Tube OD) of the rigid tubing. By way of illustration: AN3 equals $3\times 1/16$ inch, yielding a $3/16$-inch outer diameter; AN4 equals $4\times 1/16$ inch, yielding a $1/4$-inch outer diameter; and AN10 equals $10\times 1/16$ inch, yielding a $5/8$-inch outer diameter.

It is further noted that, in the hoses according to the present disclosure, the AN numeral is typically understood to correspond to the inner diameter (ID) of the associated hose. However, the actual inner diameter may deviate slightly from the nominal value depending upon the wall thickness of the particular hose selected.

The AN fittings utilize straight threads (unified national fine (UNF)/unified national fine thread with large radius root (UNJF)) and achieve a metal-to-metal seal exclusively by means of the 37° flare conical surface, without reliance upon any tapered thread sealing mechanism. Consequently, the reaming tool employed must be precisely matched to the selected AN specification so as to ensure proper insertion into the interior of the corresponding hose and formation of a correct 37° flare conical surface.

With the accommodating space 130 as the receiving reference, the two reaming assemblies are simultaneously accommodated inside the gripping body 100, thereby realizing full utilization of the tool body space and avoiding the inconvenience of additionally carrying accessories. The detachable mounting and storage design of the first reaming assembly 200 and the second reaming assembly 300 allows rapid interchange according to operational requirements, ensuring that the most suitable reaming assembly can be selected for each operation, thereby further improving reaming precision and operation efficiency, and effectively solving the problems in the prior art of poor compatibility of a single tool and inconvenience in carrying.

Figure 3:
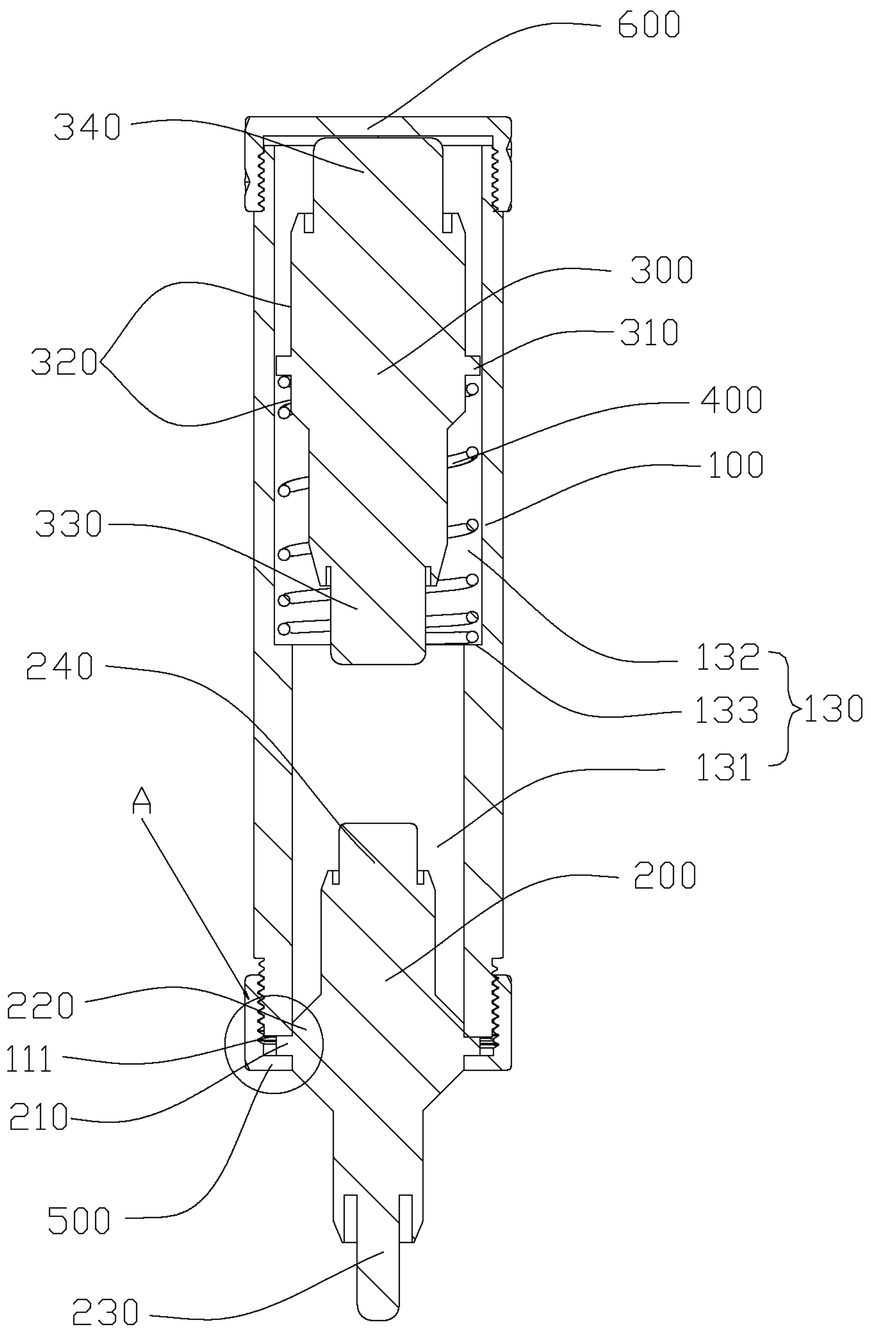
FIG. 3 is a cross-sectional view of the reaming tool according to one embodiment of the present disclosure.
Figure 4:
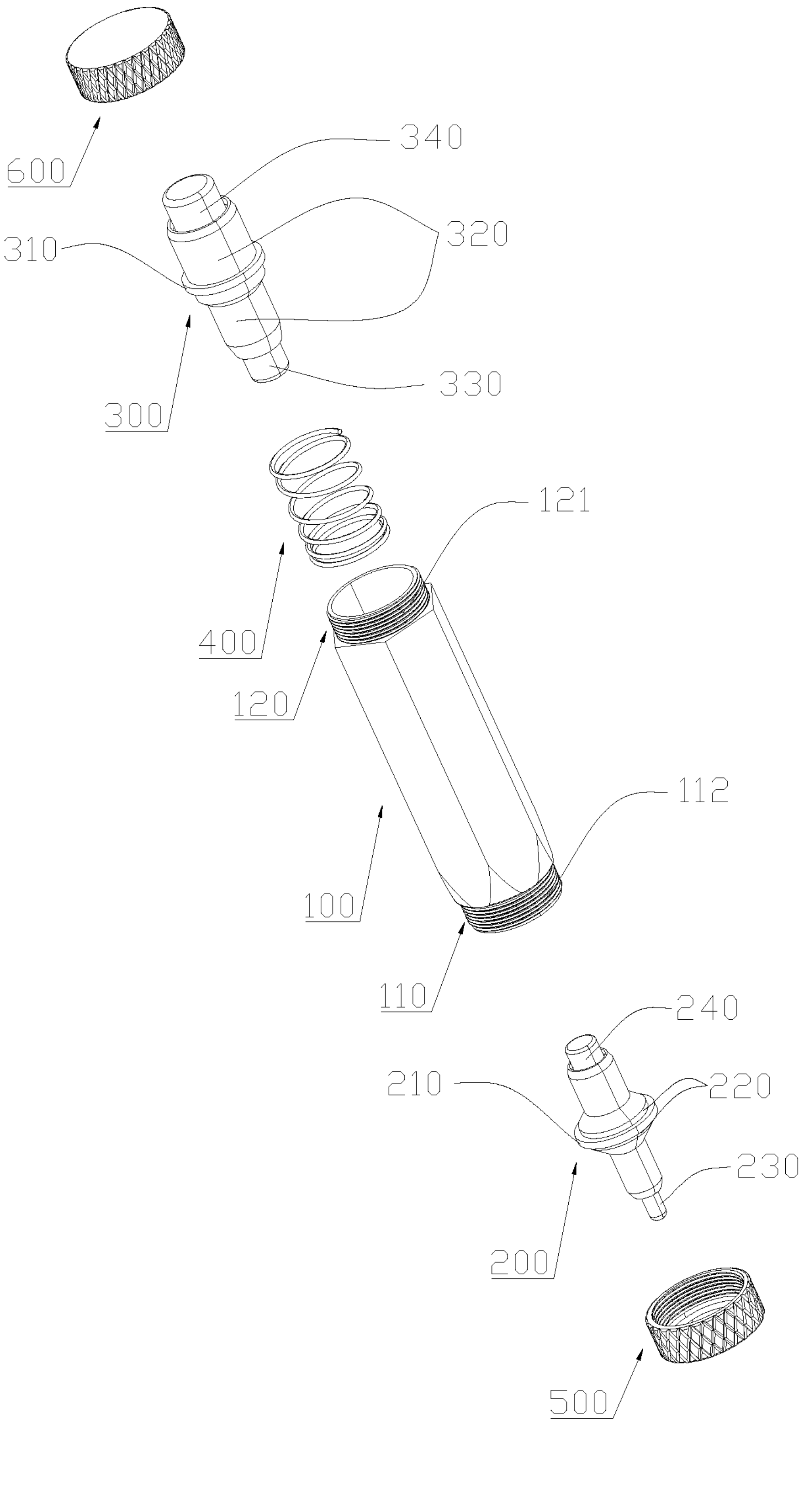
FIG. 4 is an exploded schematic diagram of the reaming tool, viewed from the first angle.
Figure 5:
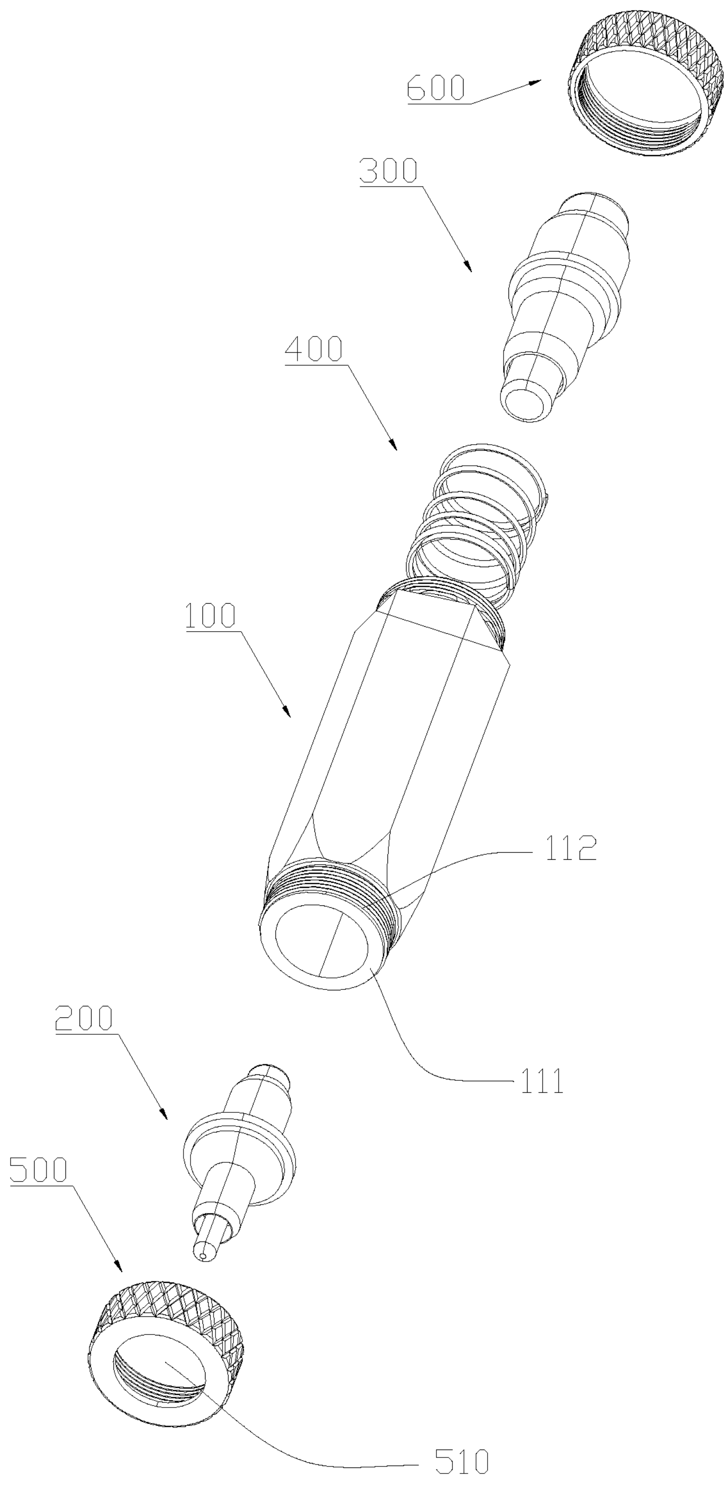
FIG. 5 is an exploded schematic diagram of the reaming tool, viewed from the second angle.
Figure 6:
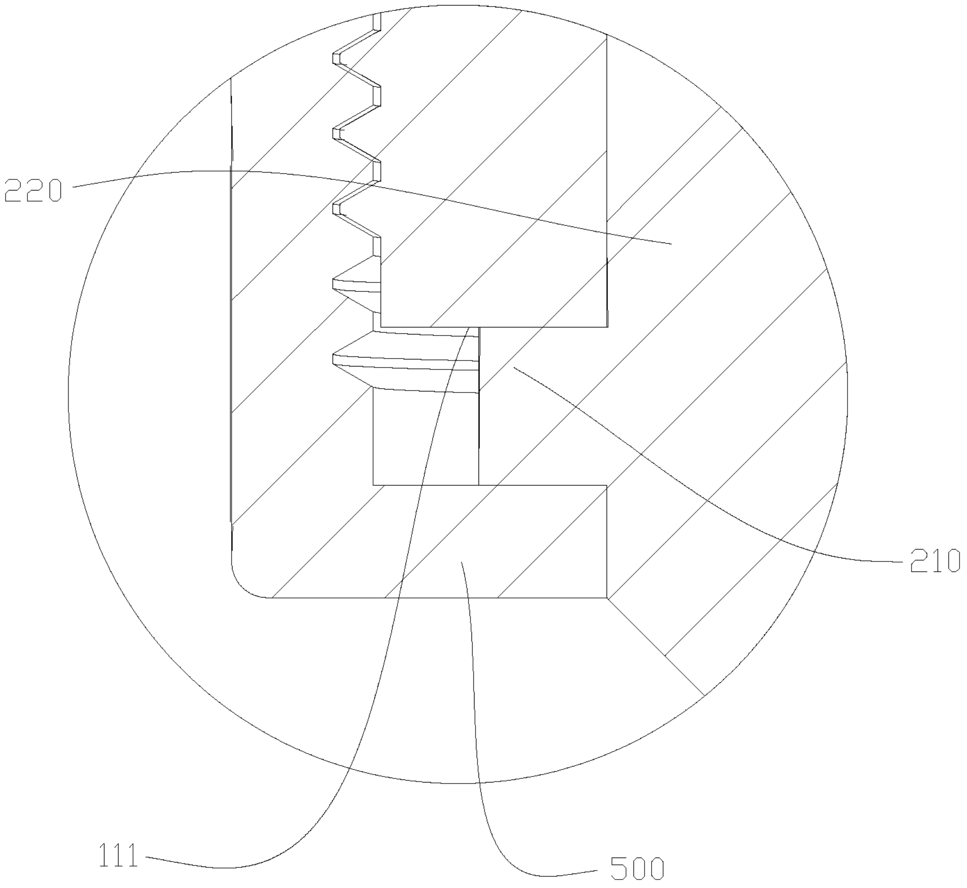
FIG. 6 is an enlarged schematic diagram of a portion A in FIG. 3.
Figure 7:
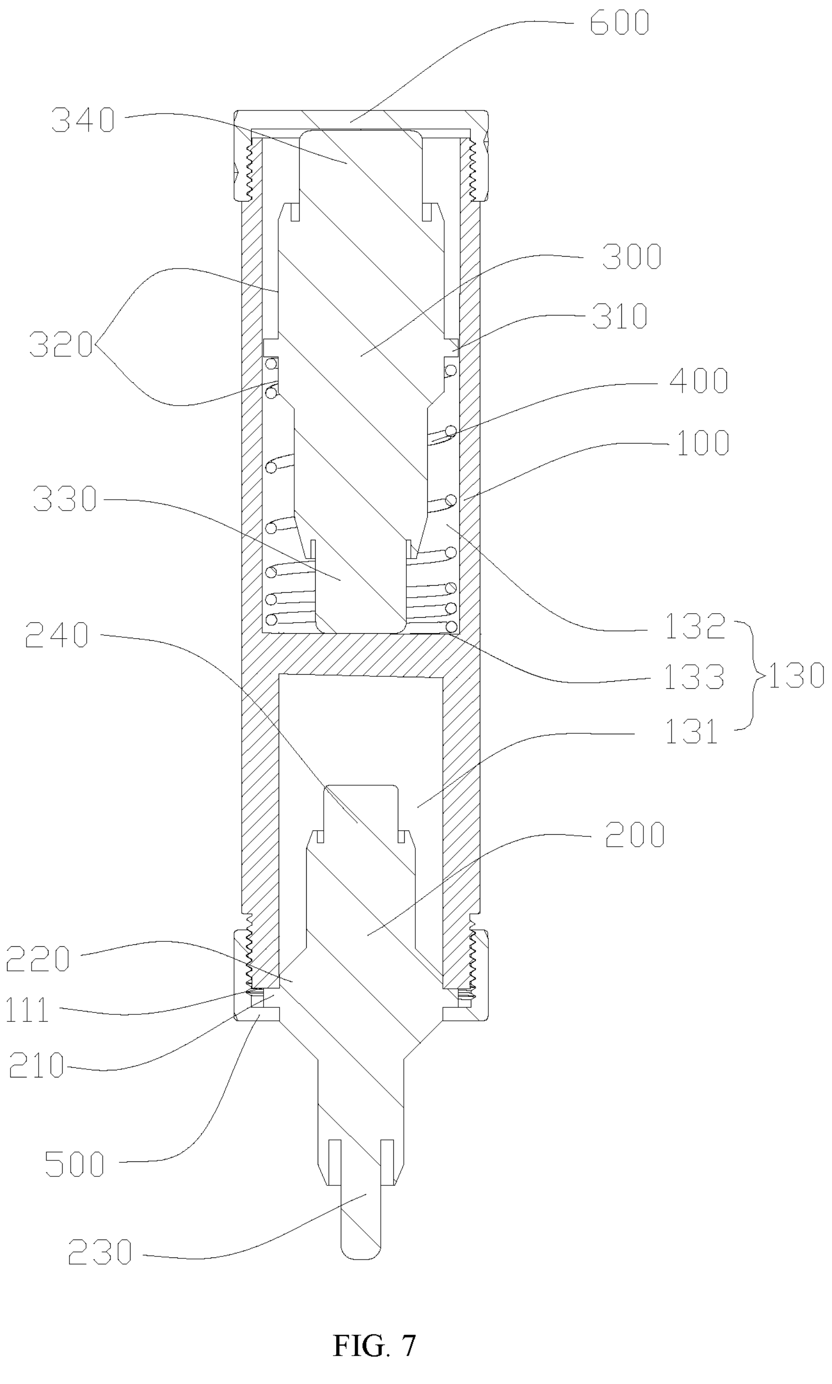
FIG. 7 is a cross-sectional view of the reaming tool according to another embodiment of the present disclosure.

It should be noted that, the accommodating space 130 refers to the spatial region inside the gripping body 100 for accommodating the two reaming assemblies. The accommodating space 130 can be implemented in various structural forms. For example, in one embodiment, the accommodating space 130 is a continuous channel penetrating or communicating the working end 110 with the receiving end 120 (as shown in FIG. 3), and the first reaming assembly 200 and the second reaming assembly 300 are simultaneously accommodated in the continuous channel and respectively located at the two end regions of the channel. Such a structure is convenient for processing and manufacturing and is suitable for mass production. In another embodiment, the accommodating space 130 includes two independent blind holes respectively formed at the working end 110 and the receiving end 120 (as shown in FIG. 7), which are separated by a solid partition. The first reaming assembly 200 is mounted in the blind hole of the working end 110, and the second reaming assembly 300 is stored in the blind hole of the receiving end 120. Such a structure, while ensuring that the two reaming assemblies are simultaneously accommodated inside the gripping body 100, provides higher structural strength. Those skilled in the art should understand that, regardless of which of the above structural forms is adopted, as long as the first reaming assembly 200 and the second reaming assembly 300 can be simultaneously accommodated inside the gripping body 100, all fall within the protection scope of the accommodating space 130 of the present disclosure.

In this embodiment, the accommodating space 130 includes a mounting channel 131 located at the working end 110 and a storage channel 132 located at the receiving end 120. The inner diameter of the mounting channel 131 is smaller than the inner diameter of the storage channel 132, and an abutting plane 133 is formed at the junction of the mounting channel 131 and the storage channel 132. Through the arrangement of the above structure, the mounting channel 131 is used to cooperate with the reaming assembly mounted on the working end 110 to provide precise radial positioning. The storage channel 132 is used to accommodate the reaming assembly stored in the receiving end 120, and its larger inner diameter provides sufficient space for storage of the reaming assembly. The abutting plane 133 at the junction of the mounting channel 131 and the storage channel 132, on the one hand, provides an axial positioning reference for the reaming assembly mounted on the working end 110, and on the other hand, provides abutting support for the arrangement of the elastic component 400. Such a stepped channel structure design enables the two reaming assemblies to coexist in the gripping body 100 without interfering with each other, which not only ensures stable mounting of the reaming assembly at the working end 110, but also realizes proper storage of the reaming assembly at the receiving end 120, thereby further improving the structural compactness and functional integration of the tool.

It should be noted that, for the convenience of description, regardless of the structural form adopted by the accommodating space 130, the portion of the accommodating space 130 located at the working end 110 is uniformly defined as the mounting channel 131, and the portion of the accommodating space 130 located at the receiving end 120 is uniformly defined as the storage channel 132. In one embodiment, the accommodating space 130 is a continuous channel penetrating or communicating the working end 110 with the receiving end 120 (as shown in FIG. 3). At this time, the mounting channel 131 and the storage channel 132 communicate with each other, and the abutting plane 133 is formed at their junction, wherein the abutting plane 133 is in the form of a hollow annular surface. In another embodiment, the accommodating space 130 includes two independent blind holes respectively formed at the working end 110 and the receiving end 120 (as shown in FIG. 7). At this time, the mounting channel 131 and the storage channel 132 are independent of each other and are separated by a solid partition, and the bottom of the storage channel 132 forms the abutting plane 133 having a circular bottom surface. It can be seen that, whether the accommodating space 130 adopts a continuous channel structure or an independent blind hole structure, the abutting plane 133 is located at the connection position of the mounting channel 131 and the storage channel 132 (the junction in the continuous channel structure, and the bottom of the blind hole in the independent blind hole structure) for providing stable abutting support for the elastic component 400. In the present disclosure, the difference between the first embodiment and the second embodiment lies in that, in the first embodiment, the accommodating space 130 is a continuous channel penetrating or communicating the working end 110 with the receiving end 120 (as shown in FIG. 3), while in the second embodiment, the accommodating space 130 includes two independent blind holes respectively formed at the working end 110 and the receiving end 120 (as shown in FIG. 7).

In this embodiment, the axial length of the mounting channel 131 is smaller than the axial length of the storage channel 132, and the axial length of the mounting channel 131 is ⅓ to ½ of the axial length of the storage channel 132. Through the arrangement of the above structure, the axial length of the mounting channel 131 is configured to be smaller than the axial length of the storage channel 132, so that the internal space distribution of the gripping body 100 becomes more reasonable. The shorter mounting channel 131 provides sufficient positioning depth for the two reaming assemblies mounted at the working end 110 while avoiding excessive occupation of the body space. The longer storage channel 132 can completely accommodate the entire reaming assembly in the stored state, ensuring that it will not accidentally come out. When the axial length of the mounting channel 131 is set to ⅓ to ½ of the axial length of the storage channel 132, the overall structure of the reaming tool reaches the optimal compact state, which not only ensures that the two reaming assemblies can coexist in the gripping body 100 without interfering with each other, but also keeps the external dimensions of the gripping body 100 within a reasonable range, facilitating gripping operation, carrying and storage. Such a length ratio design maximizes the space utilization rate while ensuring the integrity of functions, thereby further improving the portability and use convenience of the tool.

In this embodiment, the first reaming assembly 200 is integrally formed as a stepped shaft, including a first abutting convex ring 210 having the largest diameter at its middle portion, and first transition shaft sections 220 respectively arranged on two sides of the first abutting convex ring 210. Each of the first transition shaft sections 220 extends outward to form a first working head 230 and a second working head 240 of different sizes. The second reaming assembly 300 is formed as a stepped shaft, including a second abutting convex ring 310 having the largest diameter at its middle portion, and second transition shaft sections 320 respectively arranged on two sides of the second abutting convex ring 310. Each of the second transition shaft sections 320 extends outward to form a third working head 330 and a fourth working head 340 of different sizes. The outer diameter of the first abutting convex ring 210 is equal to the outer diameter of the second abutting convex ring 310, and both are configured to match the inner diameter of the storage channel 132. The outer diameter of each of the first transition shaft sections 220 is equal to the outer diameter of the second transition shaft sections 320, and both are configured to cooperate with the mounting channel 131.

Through the arrangement of the above structure, the first reaming assembly 200 and the second reaming assembly 300 adopt a similar mirror-symmetric stepped shaft structure design, and each reaming assembly integrates two working heads of different sizes, realizing the function that a single reaming assembly can cover two hose sizes. When any reaming assembly is mounted to the working end 110, its transition shaft sections cooperate with the mounting channel 131 to ensure that the two working heads remain coaxial with the gripping body 100. Its abutting convex ring 210 abuts against the abutting end face 111 of the working end 110 to provide axial positioning. When the reaming assembly is stored in the receiving end 120, its abutting convex ring 210 slidingly cooperates with the inner wall of the storage channel 132 to ensure stability in the stored state. The arrangement that the outer diameters of the first abutting convex ring 210 and the second abutting convex ring 310 are equal enables the two reaming assemblies to share the storage channel 132 universally. The arrangement that the outer diameters of the first transition shaft sections 220 and the second transition shaft sections 320 are equal enables the two reaming assemblies to share the mounting channel 131 universally. Such a design of uniform dimensions and complementary functions allows the first reaming assembly 200 and the second reaming assembly 300 to be completely interchangeable between the working end 110 and the receiving end 120. The user only needs to carry one tool body and two reaming assemblies to realize reaming operations on four different sizes of PTFE hoses, greatly improving the applicability and use convenience of the tool.

In this embodiment, the working end 110 includes an abutting end face 111, the first abutting convex ring 210 and the second abutting convex ring 310 are both configured to abut against the abutting end face 111. The first working head 230, the second working head 240, the third working head 330 and the fourth working head 340 are respectively configured to match four different sizes of hoses. The four different sizes are 4AN, 6AN, 8AN and 10AN. Through the arrangement of the above structure, the abutting end face 111 provides a precise axial positioning reference for the reaming assembly mounted on the working end 110. When the first reaming assembly 200 or the second reaming assembly 300 is mounted on the working end 110, its abutting convex ring closely conforms to the abutting end face 111, thereby ensuring that the reaming assembly is accurately limited in the axial direction and avoiding the problems of inconsistent reaming depth or non-round mouth correction caused by deviation in the mounting position. The four working heads respectively match the four commonly used sizes of PTFE hoses, namely 4AN, 6AN, 8AN and 10AN, covering the vast majority of application scenarios in the fields of automobiles, hydraulics and fluid transmission. Through the combined configuration of two reaming assemblies and four working heads, a user only needs to carry a single tool body to meet the reaming requirements of all commonly used sizes of hoses, without the need to purchase or carry multiple tools separately according to different sizes. This one-tool full-coverage design significantly reduces the cost of use, solves the problems of incomplete size coverage of traditional tools and the necessity of using multiple tools in combination, and further improves the user experience.

In this embodiment, the reaming tool also includes an elastic component 400, the elastic component 400 is disposed between the abutting plane 133 and the first abutting convex ring 210 or the second abutting convex ring 310 stored in the receiving end 120 for applying an axial preload force to the first reaming assembly 200 or the second reaming assembly 300. One end of the elastic component 400 abuts against the abutting plane 133 and the other end abuts against the first abutting convex ring 210 or the second abutting convex ring 310. The elastic component 400 is a spring. Through the arrangement of the above structure, the elastic component 400 forms a continuous axial preload force inside the receiving end 120. When the second reaming assembly 300 is stored in the receiving end 120, one end of the elastic component 400 abuts against the abutting plane 133 and the other end abuts against the second abutting convex ring 310, pushing the second reaming assembly 300 toward the port direction of the receiving end 120, so that it always maintains stable axial positioning in the non-use state. When the first reaming assembly 200 is stored in the receiving end 120, the elastic component 400 similarly acts on the first abutting convex ring 210. This preload structure effectively eliminates the axial play gap of the reaming assembly inside the storage channel 132, avoids abnormal noise generated by vibration during tool carrying or use, and improves operational comfort and the sense of product quality. At the same time, the preload force of the elastic component 400, cooperating with the subsequently provided end-cap structure, can reliably fix the stored reaming assembly inside the receiving end 120, preventing it from accidentally falling out when the tool is inverted or shaken. The adoption of a spring as the elastic component 400 has the advantages of simple structure, low cost, stable preload force and long service life, further enhancing the structural reliability and use stability of the tool.

In this embodiment, the working end 110 of the gripping body 100 is provided with a first external thread 112, and the receiving end 120 is provided with a second external thread 121. The reaming tool further includes a first end cap 500 having an internal thread that cooperates with the first external thread 112. When the first reaming assembly 200 or the second reaming assembly 300 is mounted on the working end 110, the first end cap 500 is configured to clamp and fix the first abutting convex ring 210 or the second abutting convex ring 310 against the abutting end face 111. The first end cap 500 includes a through hole 510, the size of the through hole 510 matches the outer diameters of the first transition shaft sections 220 and the second transition shaft sections 320. When the first end cap 500 is threadedly connected to the working end 110, one working head of the first reaming assembly 200 or the second reaming assembly 300 mounted on the working end 110 protrudes from the through hole 510 for cooperating with a hose of the corresponding size, while the other working head of the first reaming assembly 200 or the second reaming assembly 300 is accommodated inside the mounting channel 131.

The reaming tool also includes a second end cap 600 having an internal thread that cooperates with the second external thread 121 to close the receiving end 120. When the second reaming assembly 300 is stored inside the storage channel 132 and the second end cap 600 is threadedly connected to the receiving end 120, the second reaming assembly 300 abuts against the second end cap 600 under the preload force of the elastic component 400, thereby being axially fixed. Through the arrangement of the above structure, the first end cap 500 cooperates with the first external thread 112 of the working end 110 to achieve reliable fixation of the reaming assembly on the working end 110. After a user mounts the first reaming assembly 200 or the second reaming assembly 300 on the working end 110 and tightens the first end cap 500, the inner end face of the first end cap presses the corresponding abutting convex ring tightly against the abutting end face 111, thereby forming stable axial locking. The size of the through hole 510 matches the outer diameter of the transition shaft sections. This not only ensures smooth protrusion of the working head but also provides radial auxiliary support to prevent deflection of the reaming assembly during operation. At this time, one working head in the use state extends from the through hole 510 for perform reaming operation on the PTFE hose of the corresponding size, while the other working head of the reaming assembly is accommodated inside the mounting channel 131 and is properly protected, thereby avoiding damage during operation or accidental injury to the operator. When it is necessary to switch hose sizes, the user only needs to unscrew the first end cap 500, remove the current reaming assembly and store it in the receiving end 120, then take out the other reaming assembly, mount it on the working end 110 and tighten the first end cap 500. This operation is simple and quick. The second end cap 600 cooperates with the second external thread 121 of the receiving end 120 to close the port of the receiving end 120. When the second reaming assembly 300 is stored inside the storage channel 132, tightening the second end cap 600 causes the elastic component 400 to exert a preload force that presses the second reaming assembly 300 tightly against the inner end face of the second end cap 600, so that it is axially fixed in the stored state, this eliminates rattling noise and prevents the reaming assembly from accidentally detaching. This design of threaded caps at both ends enables the mounting, switching and storage operations of the tool to be completed by manual screwing without any additional tools, greatly improving operational convenience. At the same time, the reliable locking characteristic of the threaded connection ensures that the reaming assembly always maintains precise axial positioning during long-term use and frequent interchange, further improving the service life of the tool. The outer surfaces of both the first end cap 500 and the second end cap 600 are provided with anti-slip structures to facilitate the user's screwing operation.

In this embodiment, the first reaming assembly 200 and the second reaming assembly 300 are interchangeably mountable on the working end 110 or storable in the receiving end 120, and the gripping body 100 has a radial cross-section configured as a regular polygon while the accommodating space 130 has a radial cross-section configured as a circle. Through the arrangement of the above structure, the complete interchangeability of the first reaming assembly 200 and the second reaming assembly 300 between the working end 110 and the receiving end 120 optimizes the flexibility of tool use. A user can, according to operation requirements, mount the reaming assembly with the corresponding working head on the working end 110 for operation while the other reaming assembly is properly stored in the receiving end 120. When hose size switching is required, it is only necessary to interchange the positions of the two reaming assemblies. This interchangeable design enables the four working heads (the first working head 230, the second working head 240, the third working head 330 and the fourth working head 340) to achieve rapid switching of among the four sizes through simple interchange of the two reaming assemblies without carrying any additional accessories, truly achieving full coverage with one reaming tool, two reaming assemblies and four sizes. At the same time, the gripping body 100 has a radial cross-section configured as a regular polygon (such as a regular hexagon or a regular octagon), which, compared with a circular cross-section, provides improved grip anti-slip performance and can effectively prevent the tool from rolling when placed on an inclined plane, thereby improving the placement stability and operational safety of the tool. The radial cross-section of the accommodating space 130 is configured as a circle, matching the stepped-shaft structure of the first reaming assembly 200 and the second reaming assembly 300, ensuring that the reaming assembly can be smoothly inserted and maintains precise coaxiality during mounting or storage, thereby guaranteeing the precision and stability of the reaming operation. This cross-sectional design of "external anti-slip and internal precision" optimizes ergonomics and practicality while ensuring the core reaming function, further improving the user experience.

As described above, the foregoing is one or more embodiments provided in conjunction with specific content and does not mean that the specific implementation of the present disclosure is limited only to these descriptions. Any approximation or similarity to the method, structure or the like of the present disclosure, or any technical deduction or substitution made on the premise of the inventive concept of the present disclosure, shall be deemed to fall within the protection scope of the present disclosure.

What is claimed is:

1. A reaming tool, comprising:

a gripping body having a working end and a receiving end, and an accommodating space is formed inside the gripping body;

a first reaming assembly, detachably mounted on the working end;

a second reaming assembly, detachably stored at the receiving end;

wherein the first reaming assembly and the second reaming assembly are configured to be simultaneously accommodated within the accommodating space of the gripping body;

wherein the accommodating space comprises a mounting channel located at the working end and a storage channel located at the receiving end, an inner diameter of the mounting channel is smaller than an inner diameter of the storage channel, and an abutting plane is formed at a junction of the mounting channel and the storage channel;

wherein the first reaming assembly has a stepped shaft shape, comprising a first abutting convex ring located in a middle and being the thickest portion, and first transition shaft sections respectively disposed on two sides of the first abutting convex ring, wherein the first transition shaft sections respectively extend outward to form a first working head and a second working head of different sizes.

2. The reaming tool of claim 1, wherein the first reaming assembly and the second reaming assembly are interchangeably mountable on the working end or storable at the receiving end.

3. The reaming tool of claim 1, wherein a radial cross-section of an outer contour of the gripping body is a regular polygon, and a radial cross-section of the accommodating space is a circle.

4. The reaming tool of claim 1, wherein an axial length of the mounting channel is smaller than an axial length of the storage channel.

5. The reaming tool of claim 4, wherein the axial length of the mounting channel is ⅓ to ½ of the axial length of the storage channel.

6. The reaming tool of claim 1, wherein the second reaming assembly is in a stepped shaft shape, comprising a second abutting convex ring located in a middle and being the thickest portion, and second transition shaft sections respectively disposed on two sides of the second abutting convex ring, wherein the second transition shaft sections respectively extending outward to form a third working head and a fourth working head of different sizes.

7. The reaming tool of claim 6, wherein an outer diameter of the first abutting convex ring is equal to an outer diameter of the second abutting convex ring, and the outer diameter of the first abutting convex ring and the outer diameter of the second abutting convex ring are configured to match the inner diameter of the storage channel.

8. The reaming tool of claim 6, wherein an outer diameter of the first transition shaft sections is equal to an outer diameter of the second transition shaft sections, and the first transition shaft sections and the second transition shaft sections are configured to fit with the mounting channel.

9. The reaming tool of claim 6, wherein the working end has an abutting end face, and when the first reaming assembly or the second reaming assembly is mounted on the working end, the first abutting convex ring or the second abutting convex ring are configured to abut against the abutting end face.

10. The reaming tool of claim 6, wherein the first working head, the second working head, the third working head, and the fourth working head are respectively configured to match four different sizes of hoses.

11. The reaming tool of claim 10, wherein the four different sizes are 4AN, 6AN, 8AN, and 10AN.

12. The reaming tool of claim 9, further comprising an elastic component disposed between the abutting plane and the first abutting convex ring or the second abutting convex ring stored at the receiving end, the elastic component being configured to apply an axial preload force to the first reaming assembly or the second reaming assembly.

13. The reaming tool of claim 12, wherein one end of the elastic component abuts against the abutting plane and the other end abuts against the first abutting convex ring or the second abutting convex ring; and the elastic component is a spring.

14. The reaming tool of claim 12, wherein the working end of the gripping body is provided with a first external thread, and the receiving end is provided with a second external thread.

15. The reaming tool of claim 14, further comprising a first end cap, the first end cap is provided with an internal thread that mates with the first external thread, the first end cap is configured to fix the first abutting convex ring or the second abutting convex ring against the abutting end face when the first reaming assembly or the second reaming assembly is mounted on the working end.

16. The reaming tool of claim 15, wherein the first end cap comprises a through hole, a size of the through hole matching outer diameters of the first transition shaft sections and the second transition shaft sections;

when the first end cap is threadedly connected to the working end, one working head of the first reaming assembly or the second reaming assembly mounted on the working end protrudes from the through hole for mating with a hose of a corresponding size, while the other working head of the first reaming assembly or the second reaming assembly is accommodated within the mounting channel.

17. The reaming tool of claim 14, further comprising a second end cap, wherein the second end cap is provided with an internal thread that mates with the second external thread, and the second end cap is configured to close the receiving end.

18. The reaming tool of claim 17, wherein, when the second reaming assembly is stored within the storage channel and the second end cap is threadedly connected to the receiving end, the second reaming assembly abuts against the second end cap under the preload force of the elastic component, thereby being axially fixed.

* * * * *